United States Patent [19]

Long

[11] 4,216,586
[45] Aug. 12, 1980

[54] PIPE INSIDE DIAMETER MEASUREMENT GAUGE

[75] Inventor: Thomas R. Long, Gretna, La.

[73] Assignee: Intracoastal Pipe Repair & Supply Co., Inc., Harvey, La. ; a part interest

[21] Appl. No.: 34,908

[22] Filed: Apr. 24, 1979

[51] Int. Cl.² ............................................. G01B 03/46
[52] U.S. Cl. ................................................. 33/178 B
[58] Field of Search ...................................... 33/178 B

[56] References Cited

U.S. PATENT DOCUMENTS

| 146,974 | 2/1874 | Allen | 33/178 B |
|---|---|---|---|
| 1,210,963 | 1/1917 | Mascher | 33/178 B |
| 1,440,441 | 1/1923 | Blood | 33/178 B |
| 2,075,024 | 3/1937 | Delano | 33/178 B |
| 2,617,201 | 11/1952 | Davies | 33/178 B |

FOREIGN PATENT DOCUMENTS

| 453296 | 3/1913 | France | 33/178 B |
|---|---|---|---|
| 136689 | 7/1919 | United Kingdom | 33/178 B |

*Primary Examiner*—Richard R. Stearns
*Attorney, Agent, or Firm*—Clarence A. O'Brien; Harvey B. Jacobson

[57] ABSTRACT

A tapered plug gauge is disclosed for making graduated determinations of the inside diameter of a pipe, permitting rapid and effective determination of those pipe lengths which are oversize. The invention has particular utility for certain applications such as in the setting of oil field production casing. Pipe diameter is determined by insertion of a gauge into the pin end of a length of pipe, the outside diameter being noted by the depth of penetration, as indicated by a referenced circumscribed ring on the frustoconical surface of the device, the reference scribe being correlated by calculation assuming a pipe thickness which relates the measurement to the outside diameter to determine whether the pipe is oversize, and accordingly, the suitability of the particular pipe segment for use. The invention can be constructed in a plurality of sizes to correspond with pipe diameters and thicknesses standard in the petroleum industry.

7 Claims, 4 Drawing Figures

U.S. Patent  Aug. 12, 1980  4,216,586
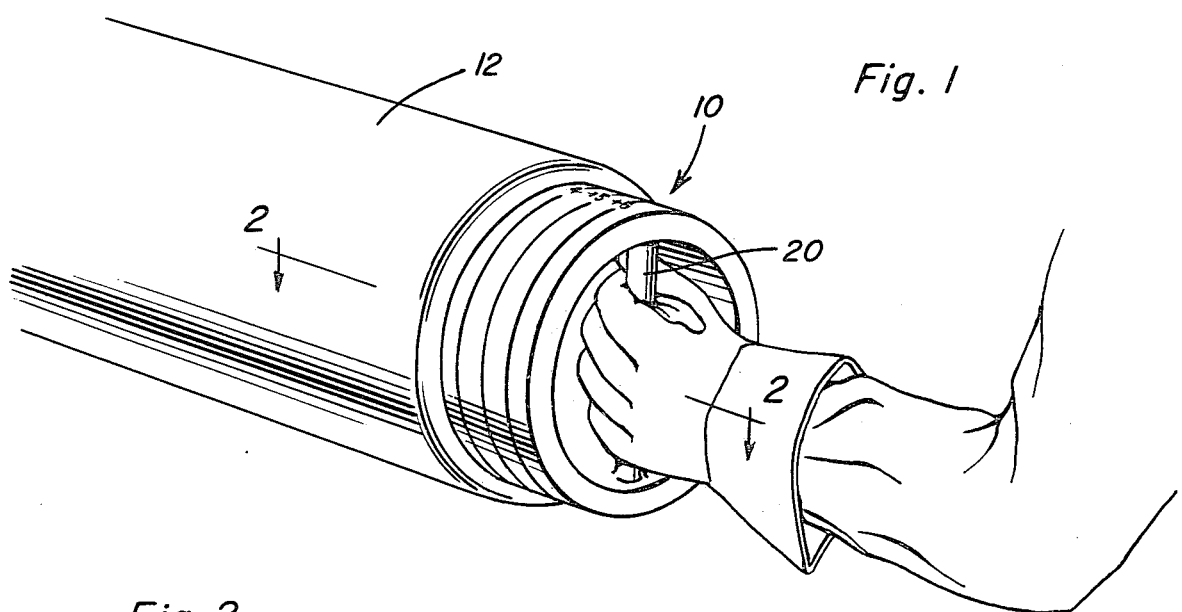
Fig. 1
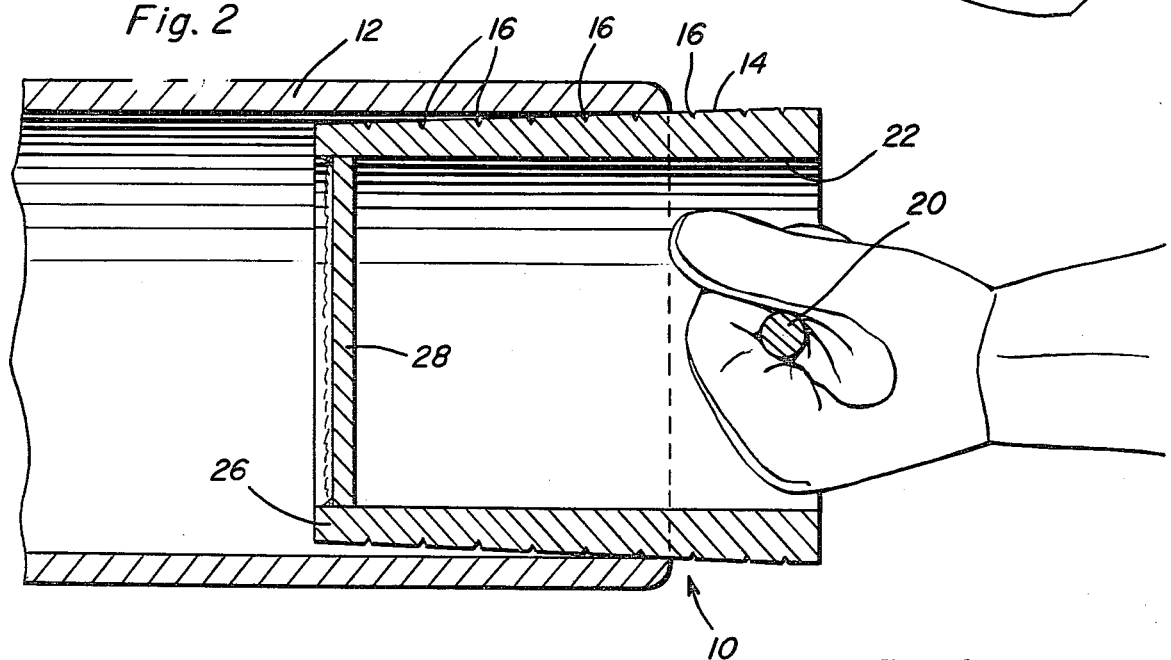
Fig. 2
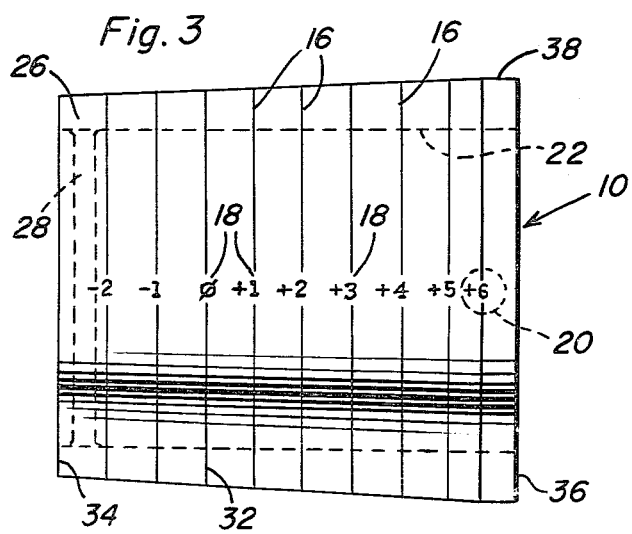
Fig. 3
Fig. 4

PIPE INSIDE DIAMETER MEASUREMENT GAUGE

BACKGROUND OF THE INVENTION

Field of the Invention

The invention relates to a measurement device for determining the suitability of a joint of casing for use at an oil well drilling site to insure that a lighter weight pipe than required is not used, and to identify oversize pipe lengths exceeding a predetermined tolerance of outside diameter before such oversize pipes are needlessly taken to an oil well production site.

Disclosure Statement

In U.S. Pat. No. 1,199,284, issued Sept. 26, 1916, by L. F. Lieser, a frustoconical gauge is disclosed having a handle for determining the inside diameter of a finger ring, with markings and numbering inscribed on the outside surface thereof to indicate inside diameter of the ring. A similar disclosure can be found in U.S. Pat. No. 1,210,963, issued Jan. 2, 1917, to P. U. Mascher, with both the Lieser and Mascher patents disclosing a handle means to facilitate insertion of the gauges. Other patents which appear to relate to the field of the invention include the following:

U.S. Pat. No. 69,954—Oct. 15, 1867—J. Richards

U.S. Pat. No. 291,373—Jan. 1, 1884—F. D. McDowell

U.S. Pat. No. 1,424,082—July 25, 1922—M. L. Clopton

SUMMARY OF THE INVENTION

The invention comprises a tapered cylindrical mandrel or plug having graduated rings inscribed on the outside frustoconical surface thereof, the rings being designated to indicate oversize pipe when the insertable part of the device is inserted as far as possible into the pipe. A separate gauge can be constructed for each weight of pipe desired to be tested, and accordingly a wide range of pipe weights can be tested for inside diameter to find those unacceptable or questionable pipe segments which fall outside a predetermined inside diameter tolerance, relatable to an outside diameter tolerance by prior calculation and assumption of a pipe wall thickness. Accordingly, a user of oil field pipe can be assured that a lighter weight pipe than required in an oil well will not be delivered or used, or that oversize pipe can be easily identified.

Another object is to provide a plurality of measurement devices which can be used for determinations of any standard sizes or weights of pipe.

Still another object is to furnish a handle to the device to facilitate rapid manual use with an array of stacked piping.

Yet another object is to include reinforcing means for preventing distortion or bowing of the frustoconical surface under the impact of blows expectable after ordinary wear and tear on the device.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a length of pipe into which the device of the present invention is inserted by the user.

FIG. 2 is a sectional view of the device of FIG. 1, taken substantially upon a plane passing along section line 2—2 on FIG. 1.

FIG. 3 is a top plan view of the device.

FIG. 4 is an end elevational view of the device in the direction of the handle.

DESCRIPTION OF THE PREFERRED EMBODIMENT

Casing made for oil industry uses is conventionally identified by weight, outside diameter and grade of steel. At any particular point of storage or use of such casing, there might be any one of several possible weights and grades of steel for any particular outside diameter of casing. The weight of a joint or segment of casing is governed by the length, diameter and wall thickness of the pipe. Wall thickness, in turn, is dependent upon outside and inside diameter, being one-half the difference between an outside and inside diameter. Accordingly, a measurement of the inside diameter which reveals a larger than expected inside diameter for a given type of steel pipe indicates either that the wall thickness is too thin or that the outside diameter is too large. If the wall thickness is excessively thin, further examination of the pipe can be conducted by taking wall thickness measurements with an ultrasonic thickness gauge in a conventional manner well-known in the art. On the other hand, if the outside diameter exceeds a predetermined limit, the oversize pipe can be identified before it is taken to an oil well production site. Oversize pipe frequently causes a problem in the setting of oil well production casing, inasmuch as equipment used to suspend the pipe in the surface casing will not accept pipe much greater than about 0.75% oversize.

When the gauge device 10 of the present invention is inserted into a pipe 12 which is preferably the pin end of a length of casing, the depth of penetration into pipe 12 is easily measured on the outside surface 14 of device 10 by noting the particular scribe marks 16 visible outside the length of pipe 12. Appropriate identifying numerals 18, best seen in FIG. 3, relate to the inside diameter measured at the opening of pipe 12. Gauge 10 is provided with handle 20 to permit manual gripping for insertion into pipe 12, handle 20 being welded to the inside surface 22 of gauge 10 at weldments 24. In order to minimize possible dimensional change of the device due to deformation at the interior end 26, plate 28 is welded to end 26 to provide support thereto. Inasmuch as even a slight bowing from perfect cylindrical configuration of end 26 or conical configuration of the tapered portion 14 of the device can affect substantially the readings obtained by gauge 10, protection against blows such as might occur while carrying the gauge, is important.

According to the method of the present invention in using gauge 10, the gauge is first inserted into the pin end of pipe 12 in the manner shown in FIGS. 1 and 2, with interior end 26 being inserted first. When further insertion is prevented by the taper of gauge 10, further insertion at that point being impossible, the diameter is read by noting the number identifying the outermost of scribe marks 16 which remains visible. Calibration of the device to a predetermined limit, assuming a standard pipe wall thickness, enables suspected oversize pipe to be identified when insertion beyond the predetermined limit is found in a particular segment of pipe. If the gauge passes the predetermined limit, and if the wall is verified to be the correct thickness, such as by conventionally testing with an ultrasonic thickness gauge, the outside diameter of the pipe is necessarily larger than the maximum tolerance and the casing can be rejected for delivery to or use at an oil field production site.

Besides identifying oversize pipe, a primary purpose of the device is to insure that a customer does not receive a lighter weight pipe than is required in the well.

It is to be understood, that in view of the range of weights and grades of steel available for any particular outside diameter size of casing, the gauge 10 can be constructed in various models available for all combinations of standard casing sizes and weights. Where certain inside diameters of different weights and grades of steel vary only minimally, it is possible that the same gauge can be used for inside diameter measurements, so long as the taper is sufficient to encompass the range of inside diameters to be measured in each instance.

The gauge can be constructed in a size which is usable for relatively small casing, such as that having a nominal API size of 4½ inches. Other sizes can also be constructed ranging up to relatively large pipe having a nominal API size of 16 inches. While each nominal API size is available in a choice of a plurality of wall thicknesses, and while each size preferably has an appropriately sized and marked gauge constructed according to the present invention, certain selected nominal sizes and thicknesses of pipe will be chosen to exemplify the invention in the following examples. Data from the examples are tabulated in the table following the examples.

EXAMPLE I

Pipe casing 12 of nominal API size 5 inches and wall thickness 0.220 inch has a nominal weight of 11.5 pounds per foot and an inside diameter of 4.560 inches. When pipe of such specifications is used, the outside diameter of the nominal ring 32 of gauge 10 is 4.560 inches; the diameter of minimum ring 34 is 4.530 inches; and the diameter of maximum ring 36 is 4.598 inches. It should be noted that the last segment 38 of outside surface 14 of gauge 10 is flat, rather than tapered toward interior end 26. Moreover, it should be noted that the outside diameter taper of gauge 10 seen in FIGS. 2 and 3 is exaggerated for clarity. Actual typical taper is about 0.08 inches per foot on each side. For instance, in Example I, the total length of gauge 10 is about 5½ inches. There are three intermediate gauge rings larger than nominal ring 32. Accordingly, the rings numbered 4, 5 and 6 in FIG. 3 are absent in the device described for Example I. It should be noted that the maximum ring outside diameter of 4.598 inches is approximately 0.75% greater than the nominal ring outside diameter. Accordingly, if the maximum diameter ring 36 passes into the length of pipe, either insufficient wall thickness or oversize pipe exceeding 0.75% can reasonably be suspected.

EXAMPLE II

Pipe 12 has a nominal API size of 8⅝ inches, with a wall thickness of 0.304 inch and nominal weight of 28 pounds per foot and an inside diameter of 8.017 inches. For this particular grade of pipe casing, nominal ring 32 has an outside diameter of 8.017 inches, maximum ring 36 has an outside diameter of 8.082 inches and minimum ring 34 has an outside diameter of 7.987 inches. For measuring such pipe, there are provided six intermediate rings larger than nominal ring 32, and ten total rings. The gauge length is about 7¾ inches between minimum ring 34 and maximum ring 36. Accordingly, such a guage has precisely the number and type of rings shown in FIG. 3, although the outside diameter taper is again exaggerated for clarity, actual typical taper being about 0.08 inches/foot per side.

EXAMPLE III

Pipe 12 has a nominal API size of 10¾ inches, a wall thickness of 0.400 inch, nominal weight of 45.5 pounds per foot, and an inside diameter of 9.950 inches. For such pipe, gauge 10 has a length of 8.5 inches, with nominal ring 32 having an outside diameter of 9.950 inches, minimum ring 34 having an outside diameter of 9.920 inches, and maximum ring 36 having an outside diameter of 10.031 inches. There are seven intermediate rings between nominal ring 32 and maximum ring 36, and eleven total rings.

While there are at least several dozen combinations of nominal API size pipe and wall thickness, the three examples listed above are believed representative of pipe casing selections which might commonly be used (see attached Table). Appropriate adjustments of the invention to other sizes are believed readily apparent from the disclosure of the present invention, and are contemplated as within the scope of the invention.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

TABLE

| | SUMMARY OF GAUGE CHARACTERISTICS | | | | | | | | | |
|---|---|---|---|---|---|---|---|---|---|---|
| Example No. | Pipe API Nominal Size (inches) | Pipe Nominal Weight (lb/ft) | Pipe Wall Thickness (inches) | Pipe Inside Diameter (inches) | Gauge Minimum Ring Outside Diameter (inches) | Gauge Nominal Ring Outside Diameter (inches) | Gauge Maximum Ring Outside Diameter (inches) | Number of Intermediate Gauge Rings | Total Number of Gauge Rings | Gauge Length (inches) |
| I | 5.000 | 11.50 | 0.220 | 4.560 | 4.530 | 4.560 | 4.598 | 3 | 7 | 5.50 |
| II | 8.625 | 28.00 | 0.304 | 8.017 | 7.987 | 8.017 | 8.082 | 6 | 10 | 7.75 |
| III | 10.750 | 45.50 | 0.400 | 9.950 | 9.920 | 9.950 | 10.031 | 7 | 11 | 8.50 |

What is claimed as new is as follows:

1. A pipe inside diameter measurement gauge for measuring the inside diameter of a length of pipe having an open end, comprising, in combination, insertable means comprising a frustoconical tapered plug for insertion into the open end of pipe and handle means connected to the insertable means for guidingly inserting the insertion means into the open end of pipe, the insertable means including measuring means comprising a uniformly tapered exterior surface of said tapered plug for determining the inside diameter of the open end, the measuring means having indicating means comprising numbered circumferential scribe marks on the tapered exterior surface for determining whether the pipe inside diameter exceeds a predetermined limit, said tapered plug has an interior end, the circumferential scribe mark surrounding said interior end being a minimum ring, the tapered plug further having an exterior end, the circumferential scribe mark surrounding the exterior end being a maximum ring, the tapered plug further having a nominal ring, being one of said plurality of circumferential scribe marks between the maximum ring and the minimum ring, said tapered plug is hollow and open on the exterior end, said tapered plug having an interior surface defining said hollowed region, and said handle means comprises a rod attached across a diameter of the exterior end at the interior surface of the plug.

2. The gauge of claim 1 wherein said interior end has a support plate welded to the interior surface of the tapered plug.

3. The gauge of claim 2 wherein said tapered plug has a taper of about 0.08 inches per foot of length of the plug.

4. The gauge of claim 3 wherein said plurality of circumferential scribe marks are between 7 and 15 in number.

5. A pipe inside diameter measurement gauge for measuring the inside diameter of a length of pipe having an open end, comprising, in combination, insertable means comprising a frusto-conical tapered plug for insertion into the open end of pipe and handle means connected to the insertable means for guidingly inserting the insertion means into the open end of pipe, the insertable means including measuring means comprising a uniformly tapered exterior surface of said tapered plug for determining the inside diameter of the open end, the measuring means having indicating means for determining whether the pipe inside diameter exceeds a predetermined limit, said tapered plug is hollow and open on the maximum circumferential exterior end, said tapered plug having an interior surface defining said hollowed region, and said handle means comprises a rod attached across a diameter of the exterior end at the interior surface of the plug.

6. The gauge of claim 5 wherein the indicating means comprises numbered circumferential scribe marks on the tapered exterior surface.

7. The gauge of claim 6 wherein said circumferential scribe marks are between 7 and 15 in number.

* * * * *